United States Patent [19]

Obitts

[11] Patent Number: 5,775,352
[45] Date of Patent: Jul. 7, 1998

[54] CAM LOCK ASSEMBLY FOR ADJUSTABLE CANE

[75] Inventor: Shane Obitts, Elyria, Ohio

[73] Assignee: Invacare Corporation, Elyria, Ohio

[21] Appl. No.: 546,635

[22] Filed: Oct. 23, 1995

[51] Int. Cl.⁶ .................................................... A45B 9/04
[52] U.S. Cl. .................. 135/69; 135/65; 135/67; 135/75; 403/104; 403/109; 403/110
[58] Field of Search .................. 135/65, 75, 84, 135/77, 69, 67; 403/350, 374, 377, 109, 110, 104; 292/338, 306, 305

[56] References Cited

U.S. PATENT DOCUMENTS

| | | | |
|---|---|---|---|
| 2,124,006 | 7/1938 | Parker | 403/110 |
| 2,811,978 | 11/1957 | Russell | 135/69 X |
| 3,955,828 | 5/1976 | Boudreau | 403/104 X |
| 4,018,440 | 4/1977 | Deutsch | 272/70.3 |
| 4,029,279 | 6/1977 | Nakatani | |
| 4,044,784 | 8/1977 | Smith | 135/75 X |
| 4,085,763 | 4/1978 | Thomas | 135/69 |
| 4,121,605 | 10/1978 | Schmerl | 135/65 |
| 4,185,936 | 1/1980 | Takahashi | 403/104 |
| 4,528,768 | 7/1985 | Anderson | 403/104 X |
| 4,528,998 | 7/1985 | Gamm | 135/75 |
| 4,596,484 | 6/1986 | Nakatani | 403/377 X |
| 4,744,690 | 5/1988 | Hsieh | 403/104 |
| 4,761,092 | 8/1988 | Nakatani | 403/104 |
| 4,811,750 | 3/1989 | McAllister | 135/66 |
| 5,139,040 | 8/1992 | Kelly | 135/69 |
| 5,184,871 | 2/1993 | LaPointe et al. | 403/374 X |
| 5,238,013 | 8/1993 | Battiston et al. | 135/77 X |
| 5,282,486 | 2/1994 | Hoover | 135/69 |
| 5,390,687 | 2/1995 | Tsai | 135/77 X |

*Primary Examiner*—Wynn E. Wood
*Attorney, Agent, or Firm*—Fay, Sharpe, Beall, Fagan, Minnich & McKee

[57] ABSTRACT

A height adjustable cane includes an upper tubular member configured to slidably receive a second tubular member in a telescoping manner. A plurality of apertures are formed in the first tubular member which allows a button of a snap button assembly to pass therethrough and lock the tubular members against relative movement. Using the push-button assembly and the telescopic feature, the length of the cane may be adjusted. Increased stability between the tubular members is provided by a cam locking assembly including a housing receiving a cam member. The cam member includes a lever and a raised camming surface that selectively engages an outer surface of the second tubular member.

11 Claims, 4 Drawing Sheets

FIG. 1
FIG. 2
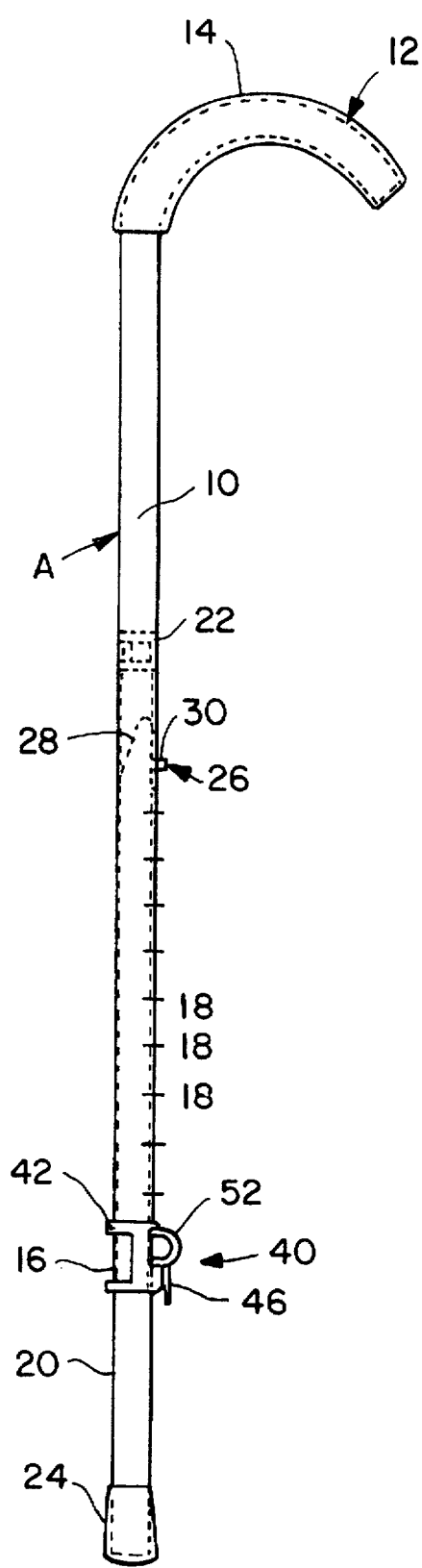
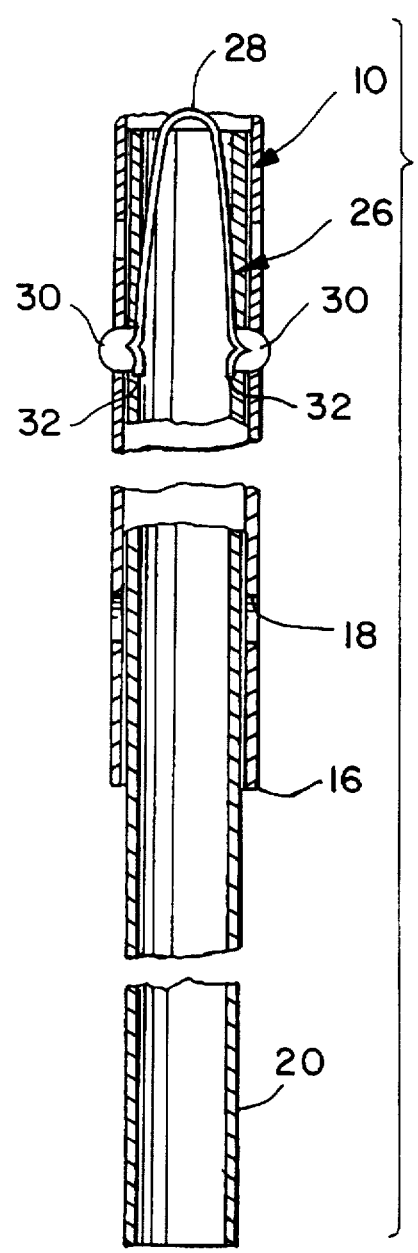

CAM LOCK ASSEMBLY FOR ADJUSTABLE CANE

BACKGROUND OF THE INVENTION

This invention relates generally to an adjustable walking cane and more particularly to an improved locking mechanism for such a cane. An adjustable cane is desirable as it allows one cane to be used by a variety of different sized individuals.

One known arrangement for adjusting the height of a cane is to provide a telescoping sleeve assembly.

An inner tubular portion of the assembly carries a spring-loaded push-button which selectively engages one of a plurality of axially or longitudinally spaced apertures formed an outer sleeve. The length of the cane depends on which aperture receives the snap button.

This adjustment feature has improved and expanded the usefulness of a cane.

Attempts have been made to improve the adjustment features of canes relative to those presently found in the market. For example, U.S. Pat. No. 4,085,763 to Thomas uses a collar having an interior opening and a wing-type male screw. By tightening the threaded wing-type screw, the position of the hollow outer sleeve is fixed relative to the hollow inner tubular member.

In U.S. Pat. No. 4,044,784 to Smith, a swivel lock fixes a handle with respect to a support member.

The swivel lock includes an internal sleeve in threaded engagement with an externally threaded portion on a lower end of a handle member. An annular compressible member is positioned between the sleeve and support member so that as the sleeve is threaded onto the threaded portion, a lower end portion bears against the compressible member to grip the exterior surface of the support member.

In both of the above patents, repetitive twisting of the height adjustment mechanism is required. Typically, individuals using a height adjustable cane are elderly or physically challenged, and such twisting and tightening motions are difficult for them to perform. Also with regard to Thomas, there is a direct metal to metal contact which eventually causes the surface of the inner tube to deteriorate causing the adjustment mechanism to become less secure.

U.S. Pat. No. 5,139,040 to Kelly describes a collapsible light-weight crutch which includes a pair of height adjustment retention rings. These rings are constructed of an elastomeric material which tightly engages respective upper and lower support members. However, the rings do not provide a compression between the inner and outer tubes and thereby do not act to reduce the wobbling effect due to the telescoping features.

The U.S. Patents to Nakatani U.S. Pat. No. 4,596,484 and Nakatani 4,029,279 show locking methods using a lever type device. However, the locking mechanisms of these devices are fairly complex and are not directed to walking canes.

Therefore, it has been deemed desirable to develop an adjustable walking cane having a locking mechanism which is reliable, easily operated by individuals without requiring repetitive turning motions or high degrees of strength, and which is simple and economical to manufacture.

SUMMARY OF THE INVENTION

The present invention contemplates a new and improved adjustable walking cane that overcomes all of the above noted problems and others and is easily locked/unlocked, is reliable, yet is economical to manufacture.

According to a more limited aspect of the invention, a first or upper tubular member has a plurality of spaced apertures formed in a sidewall thereof. A second or lower tubular member is inserted in a telescoping manner into the first tubular member and carries a spring biased snap button that extends through one of the apertures. A cam locking assembly includes a housing mounted on the first tubular member that receives a cam member selectively actuated by a lever. A raised surface on the cam member engages the second tubular member providing a radial locking force that limits relative movement between the first and second tubular members.

According to a more limited aspect of the invention, the cam housing includes a recess that receives the lever in an actuated position.

According another aspect of the invention, the raised surface of the cam member is preferably a general triangular prism configuration that provides a positive locking/unlocking feedback action to the user when the cam member is actuated/deactuated.

A principal advantage of the invention is the provision of a height adjustable walking cane that includes a locking member that is easily actuated and deactuated.

Another advantage of the invention resides in the positive feedback that confirms that the cam member has been actuated.

Yet another advantage of the subject invention resides in the simple construction of the cam locking assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a side view of a height adjustable cane having a cam locking assembly formed in accordance with the teachings of the subject invention;

FIG. 2 is a longitudinal cross-sectional view of the spring biased snap button assembly used in conjunction with the cam locking assembly for an adjustable cane;

DETAILED DESCRIPTION OF THE PREFERRED EMBODIMENTS

Figure 3A:
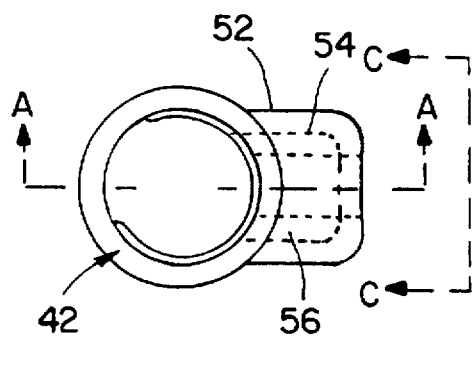
FIG. 3 is a top plan view of the cam housing.
FIG. 3B is a cross-sectional view of the cam housing taken generally along lines A—A of FIG. 3A.
FIG. 3C is an elevational view of the cam housing taken generally along the lines C—C of FIG. 3A.

Referring now to the drawings wherein the showings are for purposes of illustrating the preferred embodiments of the invention only and not for purposes of limiting same. FIG. 1 shows an adjustable cane A having a first or upper tubular member 10 which includes a handle portion 12 at one end. The handle can adopt a variety of styles or configurations to conform to desired comfort, gripping, or weight bearing considerations, and may include a hand grip 14 for comfort and/or wrist strap (not shown) to keep the cane close at hand. The other end of the first member terminates in a hollow open end 16. Intermediate the handle and the end 16 are a plurality of openings or apertures 18. Preferably, the openings are generally equi-spaced in a longitudinal direction to provide height adjustment of the cane as will be described in greater detail below.

A second or lower tubular member 20 is at least partially received within the hollow open end 16 of the first tubular member in a telescoping relationship. The lower tubular member further includes a plastic plug 22 received in one end and a rubber bottom tip 24 secured to the other end. The plug serves as an anti-rattle member by providing an increased interference fit between the first and second tubular members where the inner and outer diameter portions of the first and second tubular members, respectively, are otherwise slightly spaced apart to allow the telescoping movement for height adjustment. The tip 24 is preferably formed from rubber because of its non-skid, shock absorbing properties when brought into contact with a supporting surface, such as the ground or a floor.

A spring biased snap button assembly 26 (FIG. 2) is at least partially secured within the second tubular member 20. It includes a biasing wire 28 carries one or more buttons 30 that selectively project through the apertures 18 formed through the sidewall of the first tubular member 10. Moreover, according to the preferred arrangement, openings 32 are formed in the sidewall of the second tubular member to receive the buttons therethrough. This holds the snap button assembly in place within the second tubular member. When an opening 18 is aligned with opening 32, the button is urged radially outward to lock the first and second tubular members against relative movement. Likewise, when the length or height of the cane is to be altered, the buttons are depressed, against the spring force of the wire, through the openings 18 and the tubular members repositioned to a desired height so that a new set of openings 18 are aligned with the snap buttons. By this structure, cane A is adjusted to a variety of lengths to accommodate different sized people. As will be appreciated, the snap button assembly may use only a single button, thus eliminating the need for a second set of openings 18, 32 shown along the left-hand side of FIG. 2. In all other respects, however, the snap button assembly would operate in the same manner as described above.

Figure 3B:
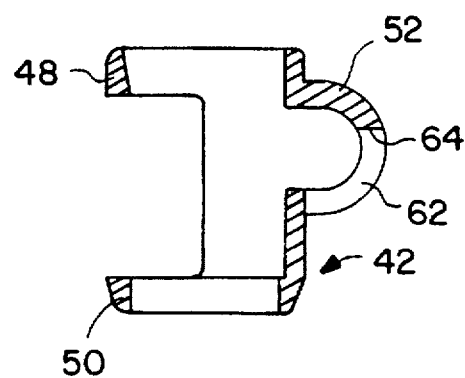
Figure 3C:
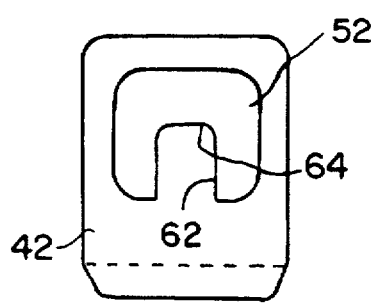
Figure 4A:
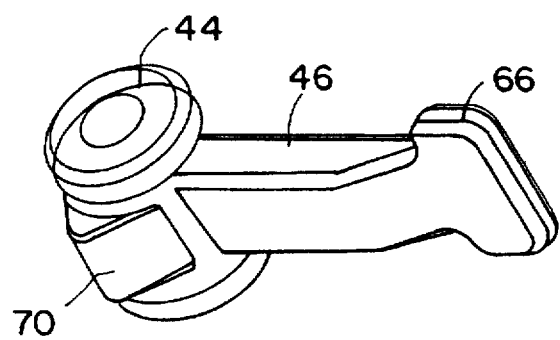
FIG. 4A is a perspective view of the cam member and lever.

Returning attention to FIG. 1, located adjacent the open end 16 of the first tubular member is a cam locking assembly 40. The assembly includes a housing 42, cam member 44, and an actuating lever 46, preferably integrally formed with the cam member. Details of the cam housing 42 are illustrated in FIGS. 3A–3C. The housing is a hollow, generally cylindrical conformation adapted for receipt over the end of the first tubular member. Preferably, the housing is circumferentially continuous at opposite ends 48, 50 and includes a mounting boss 52 extending outwardly from the sidewall. A cavity 52 is formed in the boss to receive the cam member therein. More particularly, the cavity has a pair of spaced recesses 54, 56 (FIG. 3A) that receive similarly dimensioned shoulders 58, 60 (FIGS. 4A, 4C) of the cam member. Moreover, the cavity 52 communicates with a cutout or notch 62 in the boss through which the actuating lever 46 of the cam member 44 extends. The actuating lever has a pivotal range of movement of approximately ninety degrees, abutting contact with the housing and the recess wall 64 defining stop surfaces that limit further travel of the lever. An enlarged tab 66 is formed on the lever at an end opposite to the cam member to facilitate actuation by a user.

Figure 4B:
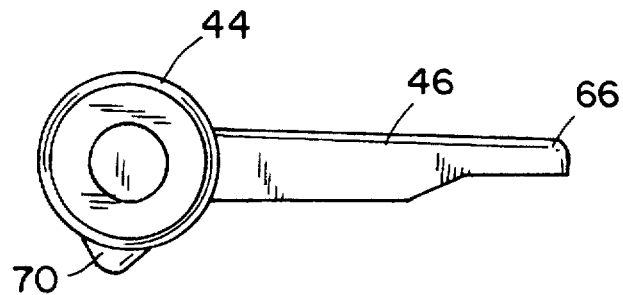
FIG. 4B is an elevational view of the cam member of FIG. 4A.
Figure 4C:
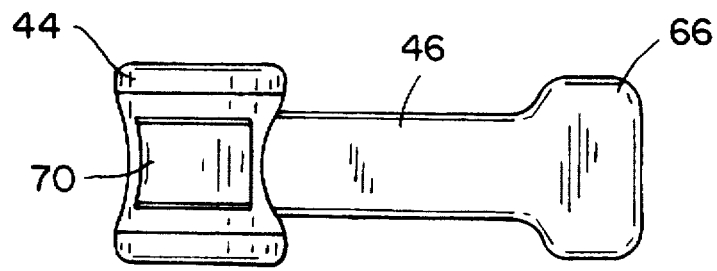
FIG. 4C is a bottom view of the cam member of FIG. 4A.
Figure 5:
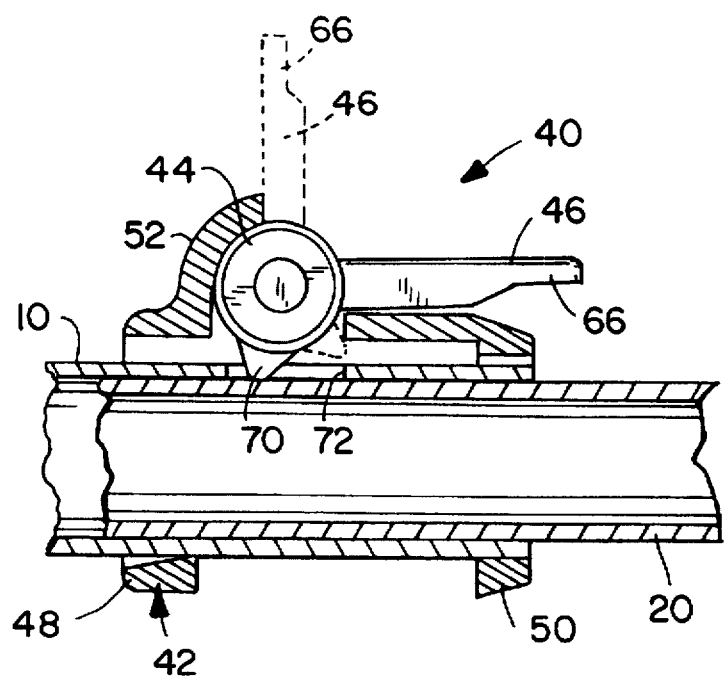
FIG. 5 illustrates the cam locking assembly in an actuated or locked relationship with the first and second telescoping tubular members, the cam member and lever being shown in phantom in a deactuated or unlocked position; and, FIG. 6 is another embodiment of the subject cane having a quad leg base.

Raised surface 70 forms the camming face which is preferably a saddle surface located atop a rounded triangular prism type configuration. For further clarification, the raised surface has a concave-convex rounded edge at an outermost point of extension of the raised surface. In other words, the raised surface is concave from one angled side of the prism to the other and is convex in a direction perpendicular thereto to follow the contour of lower tubular member 20 when engaged. The outermost point of extension of the raised surface is located at an angle slightly greater than ninety degrees from the lever as best illustrated in FIGS. 4B and 5. In this manner, the user encounters a positive feedback as the lever is rotated from an actuated to a deactuated position, or vice versa.

The raised surface extends through an opening 72 formed in the lower region of the first tubular member and when actuated to the slid showing of FIG. 5 tightly engages the external surface of the second tubular member. When fully actuated, the lever is disposed generally flush with the outer surface of the housing and the raised surface is slightly over-center. When deactuated, and as shown in phantom in FIG. 5, the raised surface is disposed in the boss cutout 62 such that it does not engage the second tubular member nor inhibit relative movement between the first and second tubular members. While the preferred material of construction of housing and cam member is plastic, it is appreciated that other materials may be used without departing from the scope and intent of the subject invention.

As may be appreciated from FIGS. 4A–4C and 5 a user may simply flip the lever 46 into and out of a locked position by applying an upward or downward force to tab 66. The applied force to the lever is minimized due to the inherent mechanical advantages afforded by use of a lever. Further, by using lever 46 to actuate (lock) and deactuate (unlock) the assembly, only a simple upward or downward force needs to be applied, overcoming the twisting action or excessive force required for other known assemblies.

Figure 6:
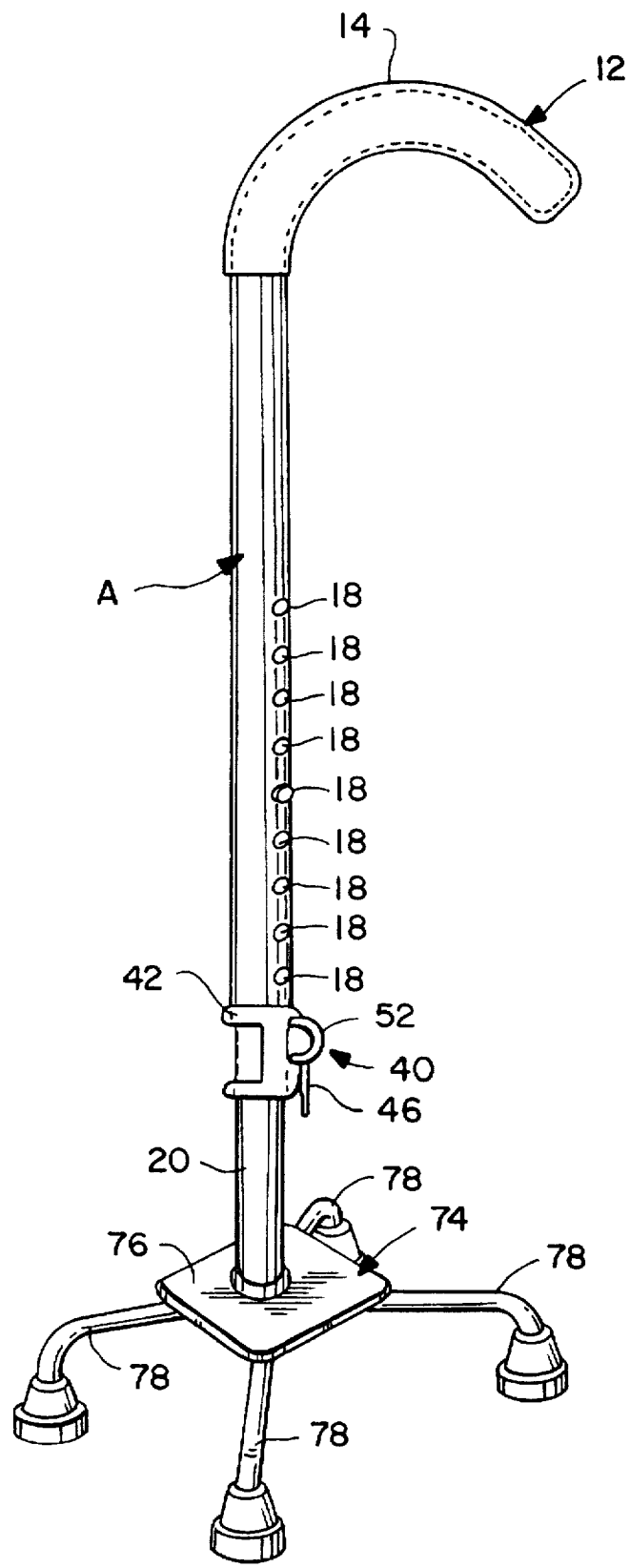

FIG. 6 is another embodiment of the subject invention wherein adjustable cane A is provided with a quad leg base 74. The base includes a rectangular plate 76 interconnecting the second tubular member to four spaced legs 78. In all other respects, this embodiment is substantially identical in structure and operation to the adjustable cane described above.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An adjustable cane comprising:
    a first member having a plurality of spaced apertures and an opening;
    a second member adapted for telescoping relation with the first member;
    a handle located at an end of one of the first member and the second member;
    a snap button assembly at least partially housed inside of the second member and having a button on a first end extending radially outward through one of the apertures in the first member;

a cam locking assembly located adjacent the opening including a housing receiving a cam member with a raised surface, and a cam lever operatively associated with the cam member for selectively engaging the raised surface with the second member through the opening of the first member.

2. The adjustable cane according to claim 1 wherein the raised surface has a generally triangular prism configuration.

3. The adjustable cane according to claim 1 further comprising a tip portion opposite the handle of the cane at an end of one of the first member and the second member, the tip portion including a base having plural legs connected thereto.

4. The adjustable cane according to claim 1 wherein the housing includes a notch dimensioned to allow the lever to be moved from a locked position, substantially parallel to the longitudinal axis of the cane to an unlocked position.

5. The adjustable cane according to claim 4 wherein the lever of the inserted cam member is integral therewith and extends from the housing through the notch.

6. The adjustable cane according to claim 1 wherein the snap button assembly further includes a button on a second end resiliently biased into, and radially outwardly through an aperture in the first member.

7. The adjustable cane according to claim 1 wherein the cam member is substantially cylindrical with a raised surface extending therefrom.

8. A height adjustable cane comprising:

a first tubular member having a plurality of spaced apertures;

a second tubular member configured to be received within the first tubular member and having at least one aperture formed thereon, and a snap button at least partially contained in the second tubular member and adapted to pass through the at least one aperture in the second tubular member and one of the apertures in the first tubular member;

a handle located at an end of one of the first member and the second member; and a cam locking assembly including a housing mounted on an outer surface of the first tubular member and a cam member located within the housing including a lever and a raised surface extending from the cam member, wherein movement of the lever positions the raised surface in contact with the second tubular member.

9. The height adjustable cane according to claim 8 wherein the raised surface has a generally saddle-shaped configuration.

10. The adjustable cane according to claim 2 wherein the raised surface is generally saddle shaped at an outermost point of extension of the raised surface.

11. The height adjustable cane according to claim 9 wherein the raised surface is generally saddle-shaped at an outermost point of extension of the raised surface.

\* \* \* \* \*